US012615282B2

(12) United States Patent
Newman et al.

(10) Patent No.: US 12,615,282 B2
(45) Date of Patent: Apr. 28, 2026

(54) SECURITY INCIDENT RANKING AND RANKING EXPLANATION

(71) Applicant: PALO ALTO NETWORKS (ISRAEL ANALYTICS) LTD., Tel Aviv (IL)

(72) Inventors: Tuvia Newman, Kiryat Gat (IL); Yinnon Meshi, Kibbutz Revivim (IL); Gal Itzhak, Holon (IL); Sharon Datner, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 176 days.

(21) Appl. No.: 18/357,121

(22) Filed: Jul. 23, 2023

(65) Prior Publication Data

US 2025/0030729 A1     Jan. 23, 2025

(51) Int. Cl.
H04L 9/40          (2022.01)

(52) U.S. Cl.
CPC ...... H04L 63/1441 (2013.01); H04L 63/1416 (2013.01)

(58) Field of Classification Search
CPC ............. H04L 63/1441; H04L 63/1416; H04L 63/1425
See application file for complete search history.

(56) References Cited

U.S. PATENT DOCUMENTS

| | | |
|---|---|---|
| 5,991,881 A | 11/1999 | Conklin et al. |
| 6,347,374 B1 | 2/2002 | Drake et al. |
| 6,704,874 B1 | 3/2004 | Porras et al. |
| 7,003,790 B1 | 2/2006 | Inoue et al. |
| 7,007,301 B2 | 2/2006 | Crosbie et al. |
| 7,178,164 B1 | 2/2007 | Bonnes |

(Continued)

FOREIGN PATENT DOCUMENTS

| | | |
|---|---|---|
| CA | 3041875 A1 | 11/2019 |
| CN | 1612532 A | 5/2005 |

(Continued)

OTHER PUBLICATIONS

U.S. Appl. No. 17/676,275 Office Action dated Feb. 29, 2024.

(Continued)

*Primary Examiner* — Michael Won
(74) *Attorney, Agent, or Firm* — Meitar Patents Ltd.; Daniel Kligler

(57)          ABSTRACT

Methods, storage systems and computer program products implement embodiments of the present invention that include initially defining a set of protective actions. Upon detecting, by a security server on a network, an incident including one or more alerts indicating malicious activity by one or more computing devices on the network, extracting a set of features indicating measurable characteristics of the incident are extracted from the alerts. Based on the alerts, respective counts for the features for the detected incident are computed and based on the features and their respective counts, a score indicating a magnitude of malicious activity for the detected incident is computed. A given feature having a highest impact on the score is identified, and a given protective action is selected based on the score, the identified feature and its respective count. Finally, the selected protective action is initiated with respect to at least some of the devices.

20 Claims, 5 Drawing Sheets

(56) References Cited

U.S. PATENT DOCUMENTS

| | | |
|---|---|---|
| 7,181,769 B1 | 2/2007 | Keanini et al. |
| 7,523,016 B1 | 4/2009 | Surdulescu et al. |
| 7,684,568 B2 | 3/2010 | Yonge, III et al. |
| 7,694,150 B1 | 4/2010 | Kirby |
| 7,703,138 B2 | 4/2010 | Desai et al. |
| 7,712,134 B1 | 5/2010 | Nucci et al. |
| 7,752,665 B1 | 7/2010 | Robertson et al. |
| 7,908,655 B1 | 3/2011 | Bhattacharyya et al. |
| 8,245,298 B2 | 8/2012 | Pletka et al. |
| 8,397,284 B2 | 3/2013 | Kommareddy et al. |
| 8,429,180 B1 | 4/2013 | Sobel et al. |
| 8,490,190 B1 | 7/2013 | Hernacki et al. |
| 8,516,573 B1 | 8/2013 | Brown et al. |
| 8,516,586 B1 | 8/2013 | Jensen et al. |
| 8,555,388 B1 | 10/2013 | Wang et al. |
| 8,578,345 B1 | 11/2013 | Kennedy et al. |
| 8,607,353 B2 | 12/2013 | Rippert, Jr. et al. |
| 8,620,942 B1 | 12/2013 | Hoffman et al. |
| 8,677,487 B2 | 3/2014 | Balupari et al. |
| 8,762,288 B2 | 6/2014 | Dill |
| 8,769,681 B1 | 7/2014 | Michels et al. |
| 8,925,095 B2 | 12/2014 | Herz et al. |
| 8,966,625 B1 | 2/2015 | Zuk et al. |
| 9,038,178 B1 | 5/2015 | Lin |
| 9,118,582 B1 | 8/2015 | Martini |
| 9,147,071 B2 | 9/2015 | Sallam |
| 9,231,962 B1 | 1/2016 | Yen et al. |
| 9,319,421 B2 | 4/2016 | Ferragut et al. |
| 9,342,691 B2 | 5/2016 | Maestas |
| 9,378,361 B1 | 6/2016 | Yen et al. |
| 9,386,028 B2 | 7/2016 | Altman |
| 9,479,522 B1 | 10/2016 | Cirkovic |
| 9,531,614 B1 | 12/2016 | Nataraj et al. |
| 9,531,736 B1 | 12/2016 | Torres et al. |
| 9,690,606 B1 | 6/2017 | Ha et al. |
| 9,690,933 B1 | 6/2017 | Singh et al. |
| 9,736,251 B1 | 8/2017 | Samant et al. |
| 9,773,112 B1 | 9/2017 | Rathor et al. |
| 9,979,739 B2 | 5/2018 | Mumcuoglu et al. |
| 9,979,742 B2 | 5/2018 | Mumcuoglu et al. |
| 10,027,694 B1 | 7/2018 | Gupta et al. |
| 10,075,461 B2 | 9/2018 | Mumcuoglu et al. |
| 10,140,453 B1 | 11/2018 | Fridakis |
| 10,181,032 B1 | 1/2019 | Sadaghiani et al. |
| 10,237,875 B1 | 3/2019 | Romanov |
| 10,360,367 B1 | 7/2019 | Mossoba et al. |
| 10,423,789 B2 | 9/2019 | Barak |
| 10,587,642 B1 | 3/2020 | Herman-Saffar et al. |
| 10,706,144 B1 | 7/2020 | Moritz et al. |
| 10,728,262 B1 * | 7/2020 | Vaswani ............... G06F 21/62 |
| 10,728,281 B2 | 7/2020 | Kurakami |
| 10,873,596 B1 | 12/2020 | Bourget et al. |
| 10,904,277 B1 | 1/2021 | Sharifi Mehr |
| 11,070,573 B1 | 7/2021 | Edwards |
| 11,100,199 B2 | 8/2021 | Subramaniam |
| 11,140,194 B2 | 10/2021 | Hecht et al. |
| 11,178,168 B1 | 11/2021 | Lin et al. |
| 11,277,423 B2 | 3/2022 | Brown |
| 11,501,261 B1 | 11/2022 | Schemers et al. |
| 11,509,680 B2 | 11/2022 | Steimberg et al. |
| 11,956,253 B1 * | 4/2024 | Lin ......................... G06N 7/01 |
| 12,045,610 B1 | 7/2024 | Myers et al. |
| 12,380,389 B2 | 8/2025 | Schmidt et al. |
| 2002/0059078 A1 | 5/2002 | Valdes et al. |
| 2002/0133586 A1 | 9/2002 | Shanklin et al. |
| 2003/0110396 A1 | 6/2003 | Lewis et al. |
| 2003/0133443 A1 | 7/2003 | Klinker et al. |
| 2004/0003286 A1 | 1/2004 | Kaler et al. |
| 2004/0015728 A1 | 1/2004 | Cole et al. |
| 2004/0117658 A1 | 6/2004 | Klaes |
| 2004/0199793 A1 | 10/2004 | Wilken et al. |
| 2004/0210769 A1 | 10/2004 | Radatti et al. |
| 2004/0250169 A1 | 12/2004 | Takemori et al. |
| 2004/0260733 A1 | 12/2004 | Adelstein et al. |
| 2005/0015624 A1 | 1/2005 | Ginter et al. |
| 2005/0018618 A1 | 1/2005 | Mulalem et al. |
| 2005/0060295 A1 | 3/2005 | Gould et al. |
| 2005/0069130 A1 | 3/2005 | Kobayashi |
| 2005/0071330 A1 | 3/2005 | Douceur et al. |
| 2005/0123138 A1 | 6/2005 | Abe et al. |
| 2005/0128989 A1 | 6/2005 | Bhagwat et al. |
| 2005/0183120 A1 | 8/2005 | Jain et al. |
| 2005/0216749 A1 | 9/2005 | Brent |
| 2005/0262556 A1 | 11/2005 | Waisman et al. |
| 2005/0262560 A1 | 11/2005 | Gassoway |
| 2005/0268112 A1 | 12/2005 | Wang et al. |
| 2005/0286423 A1 | 12/2005 | Poletto et al. |
| 2006/0018466 A1 | 1/2006 | Adelstein et al. |
| 2006/0075462 A1 | 4/2006 | Golan |
| 2006/0075492 A1 | 4/2006 | Golan et al. |
| 2006/0075500 A1 | 4/2006 | Bertman et al. |
| 2006/0107321 A1 | 5/2006 | Tzadikario |
| 2006/0126522 A1 | 6/2006 | Ph |
| 2006/0136720 A1 | 6/2006 | Armstrong et al. |
| 2006/0137009 A1 | 6/2006 | Chesla |
| 2006/0149848 A1 | 7/2006 | Shay |
| 2006/0156398 A1 | 7/2006 | Ross et al. |
| 2006/0161984 A1 | 7/2006 | Phillips et al. |
| 2006/0190803 A1 | 8/2006 | Kawasaki et al. |
| 2006/0191010 A1 | 8/2006 | Benjamin |
| 2006/0215627 A1 | 9/2006 | Waxman |
| 2006/0242694 A1 | 10/2006 | Gold et al. |
| 2006/0259967 A1 | 11/2006 | Thomas et al. |
| 2006/0282893 A1 | 12/2006 | Wu et al. |
| 2007/0011319 A1 | 1/2007 | McClure et al. |
| 2007/0072661 A1 | 3/2007 | Lototski |
| 2007/0073519 A1 | 3/2007 | Long |
| 2007/0116277 A1 | 5/2007 | Ro et al. |
| 2007/0124474 A1 | 5/2007 | Margulis |
| 2007/0198603 A1 | 8/2007 | Tsioutsiouliklis et al. |
| 2007/0201691 A1 | 8/2007 | Kumagaya |
| 2007/0201693 A1 | 8/2007 | Ohno |
| 2007/0218874 A1 | 9/2007 | Sinha et al. |
| 2007/0226796 A1 | 9/2007 | Gilbert et al. |
| 2007/0226802 A1 | 9/2007 | Gopalan et al. |
| 2007/0245420 A1 | 10/2007 | Yong et al. |
| 2007/0255724 A1 | 11/2007 | Jung et al. |
| 2007/0283166 A1 | 12/2007 | Yami et al. |
| 2008/0005782 A1 | 1/2008 | Aziz |
| 2008/0013725 A1 | 1/2008 | Kobayashi |
| 2008/0016339 A1 | 1/2008 | Shukla |
| 2008/0016570 A1 | 1/2008 | Capalik |
| 2008/0104046 A1 | 5/2008 | Singla et al. |
| 2008/0104703 A1 | 5/2008 | Rihn et al. |
| 2008/0134296 A1 | 6/2008 | Amitai et al. |
| 2008/0148381 A1 | 6/2008 | Aaron |
| 2008/0198005 A1 | 8/2008 | Schulak et al. |
| 2008/0244097 A1 | 10/2008 | Candelore et al. |
| 2008/0262991 A1 | 10/2008 | Kapoor et al. |
| 2008/0271143 A1 | 10/2008 | Stephens et al. |
| 2008/0285464 A1 | 11/2008 | Katzir |
| 2008/0301567 A1 | 12/2008 | Martin et al. |
| 2009/0007100 A1 | 1/2009 | Field et al. |
| 2009/0007220 A1 | 1/2009 | Ormazabal et al. |
| 2009/0115570 A1 | 5/2009 | Cusack, Jr. |
| 2009/0157574 A1 | 6/2009 | Lee |
| 2009/0164522 A1 | 6/2009 | Fahey |
| 2009/0193103 A1 | 7/2009 | Small et al. |
| 2009/0265777 A1 | 10/2009 | Scott |
| 2009/0320136 A1 | 12/2009 | Lambert et al. |
| 2010/0014594 A1 | 1/2010 | Beheydt et al. |
| 2010/0054241 A1 | 3/2010 | Shah et al. |
| 2010/0071063 A1 | 3/2010 | Wang et al. |
| 2010/0107257 A1 | 4/2010 | Ollmann |
| 2010/0146292 A1 | 6/2010 | Shi et al. |
| 2010/0146293 A1 | 6/2010 | Shi et al. |
| 2010/0146501 A1 | 6/2010 | Wyatt et al. |
| 2010/0162400 A1 | 6/2010 | Feeney et al. |
| 2010/0197318 A1 | 8/2010 | Petersen et al. |
| 2010/0212013 A1 | 8/2010 | Kim et al. |
| 2010/0217861 A1 | 8/2010 | Wu |
| 2010/0235915 A1 | 9/2010 | Memon et al. |
| 2010/0268818 A1 | 10/2010 | Richmond et al. |
| 2010/0272257 A1 | 10/2010 | Beals |

(56) References Cited

U.S. PATENT DOCUMENTS

| 2010/0278054 A1 | 11/2010 | Dighe |
| 2010/0280978 A1 | 11/2010 | Shimada et al. |
| 2010/0284282 A1 | 11/2010 | Golic |
| 2010/0299430 A1 | 11/2010 | Powers et al. |
| 2011/0026521 A1 | 2/2011 | Gamage et al. |
| 2011/0035795 A1 | 2/2011 | Shi |
| 2011/0087779 A1 | 4/2011 | Martin et al. |
| 2011/0125770 A1 | 5/2011 | Battestini et al. |
| 2011/0135090 A1 | 6/2011 | Chan et al. |
| 2011/0138463 A1 | 6/2011 | Kim et al. |
| 2011/0153748 A1 | 6/2011 | Lee et al. |
| 2011/0185055 A1 | 7/2011 | Nappier et al. |
| 2011/0185421 A1 | 7/2011 | Wittenstein et al. |
| 2011/0214187 A1 | 9/2011 | Wittenstein et al. |
| 2011/0247071 A1 | 10/2011 | Hooks et al. |
| 2011/0265011 A1 | 10/2011 | Taylor et al. |
| 2011/0270957 A1 | 11/2011 | Phan et al. |
| 2011/0271343 A1 | 11/2011 | Kim et al. |
| 2011/0302653 A1 | 12/2011 | Frantz et al. |
| 2011/0317770 A1 | 12/2011 | Lehtiniemi et al. |
| 2012/0042060 A1 | 2/2012 | Jackowski et al. |
| 2012/0079596 A1 | 3/2012 | Thomas et al. |
| 2012/0102359 A1 | 4/2012 | Hooks |
| 2012/0136802 A1 | 5/2012 | Mcquade et al. |
| 2012/0137342 A1 | 5/2012 | Hartrell et al. |
| 2012/0143650 A1 | 6/2012 | Crowley et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0240185 A1 | 9/2012 | Kapoor et al. |
| 2012/0275505 A1 | 11/2012 | Tzannes et al. |
| 2012/0308008 A1 | 12/2012 | Kondareddy et al. |
| 2012/0331553 A1 | 12/2012 | Aziz et al. |
| 2013/0031037 A1 | 1/2013 | Brandt et al. |
| 2013/0031600 A1 | 1/2013 | Luna et al. |
| 2013/0061045 A1 | 3/2013 | Kiefer et al. |
| 2013/0083700 A1 | 4/2013 | Sndhu et al. |
| 2013/0097706 A1 | 4/2013 | Titonis et al. |
| 2013/0111211 A1 | 5/2013 | Winslow et al. |
| 2013/0196549 A1 | 8/2013 | Sorani |
| 2013/0298237 A1 | 11/2013 | Smith |
| 2013/0298243 A1 | 11/2013 | Kumar et al. |
| 2013/0333041 A1 | 12/2013 | Christodorescu et al. |
| 2014/0010367 A1 | 1/2014 | Wang |
| 2014/0013434 A1 | 1/2014 | Ranum et al. |
| 2014/0165207 A1 | 6/2014 | Engel et al. |
| 2014/0198669 A1 | 7/2014 | Brown et al. |
| 2014/0201776 A1 | 7/2014 | Minemura et al. |
| 2014/0215619 A1 | 7/2014 | Lee et al. |
| 2014/0230059 A1 | 8/2014 | Wang |
| 2014/0325643 A1 | 10/2014 | Bart et al. |
| 2015/0026810 A1 | 1/2015 | Friedrichs et al. |
| 2015/0032884 A1 | 1/2015 | Greifender et al. |
| 2015/0040219 A1 | 2/2015 | Garraway et al. |
| 2015/0047032 A1 | 2/2015 | Hannis et al. |
| 2015/0071308 A1 | 3/2015 | Webb, III et al. |
| 2015/0121461 A1 | 4/2015 | Dulkin et al. |
| 2015/0156270 A1 | 6/2015 | Teraoka et al. |
| 2015/0180883 A1 | 6/2015 | Aktas et al. |
| 2015/0195300 A1 | 7/2015 | Adjaoute |
| 2015/0207694 A1 | 7/2015 | Inches et al. |
| 2015/0264069 A1 | 9/2015 | Beauchesne et al. |
| 2015/0295903 A1 | 10/2015 | Yi et al. |
| 2015/0304346 A1 | 10/2015 | Kim |
| 2015/0324188 A1 | 11/2015 | Raje et al. |
| 2015/0341380 A1 | 11/2015 | Heo et al. |
| 2015/0341389 A1 | 11/2015 | Kurakami |
| 2015/0356451 A1 | 12/2015 | Gupta et al. |
| 2016/0021141 A1 | 1/2016 | Liu et al. |
| 2016/0028758 A1 | 1/2016 | Ellis et al. |
| 2016/0119292 A1 | 4/2016 | Kaseda et al. |
| 2016/0127390 A1 | 5/2016 | Lai et al. |
| 2016/0142746 A1 | 5/2016 | Schuberth |
| 2016/0191918 A1 | 6/2016 | Lai et al. |
| 2016/0234167 A1 | 8/2016 | Engel et al. |
| 2016/0247163 A1 | 8/2016 | Donsky et al. |
| 2016/0315954 A1 | 10/2016 | Peterson et al. |
| 2016/0323299 A1 | 11/2016 | Huston, III |
| 2016/0359895 A1 | 12/2016 | Chiu et al. |
| 2017/0007128 A1 | 1/2017 | Takano et al. |
| 2017/0026387 A1 | 1/2017 | Vissamsetty et al. |
| 2017/0026395 A1 | 1/2017 | Mumcuoglu et al. |
| 2017/0054744 A1 | 2/2017 | Mumcuoglu et al. |
| 2017/0063912 A1 | 3/2017 | Sudhakar et al. |
| 2017/0063921 A1 | 3/2017 | Fridman et al. |
| 2017/0078312 A1 | 3/2017 | Yamada et al. |
| 2017/0111376 A1 | 4/2017 | Friedlander et al. |
| 2017/0171229 A1 | 6/2017 | Arzi et al. |
| 2017/0171231 A1* | 6/2017 | Reybok, Jr. ......... H04L 63/1433 |
| 2017/0262633 A1 | 9/2017 | Miserendino et al. |
| 2017/0289178 A1 | 10/2017 | Roundy et al. |
| 2017/0294112 A1 | 10/2017 | Kushnir |
| 2017/0295190 A1 | 10/2017 | Brown |
| 2017/0374090 A1 | 12/2017 | McGrew et al. |
| 2018/0004948 A1 | 1/2018 | Martin et al. |
| 2018/0007013 A1 | 1/2018 | Wang |
| 2018/0048662 A1 | 2/2018 | Jang et al. |
| 2018/0075240 A1 | 3/2018 | Chen |
| 2018/0077189 A1 | 3/2018 | Doppke et al. |
| 2018/0124077 A1* | 5/2018 | Carver .................. G06N 20/00 |
| 2018/0288081 A1 | 10/2018 | Yermakov |
| 2018/0332064 A1 | 11/2018 | Harris et al. |
| 2018/0365416 A1 | 12/2018 | Monastyrsky et al. |
| 2018/0373820 A1 | 12/2018 | Knezevic et al. |
| 2019/0036978 A1 | 1/2019 | Shulman-Peleg et al. |
| 2019/0044963 A1 | 2/2019 | Rajasekharan et al. |
| 2019/0044965 A1 | 2/2019 | Pilkington et al. |
| 2019/0065738 A1 | 2/2019 | Kim et al. |
| 2019/0068620 A1 | 2/2019 | Avrahami et al. |
| 2019/0075344 A1 | 3/2019 | Brown |
| 2019/0098025 A1 | 3/2019 | Lim |
| 2019/0207966 A1 | 7/2019 | Vashisht et al. |
| 2019/0268361 A1 | 8/2019 | Blewett et al. |
| 2019/0297097 A1 | 9/2019 | Gong et al. |
| 2019/0319981 A1 | 10/2019 | Meshi et al. |
| 2019/0334931 A1 | 10/2019 | Arlitt et al. |
| 2020/0007566 A1 | 1/2020 | Wu |
| 2020/0033144 A1 | 1/2020 | Du et al. |
| 2020/0065483 A1 | 2/2020 | Mu et al. |
| 2020/0082296 A1 | 3/2020 | Fly et al. |
| 2020/0136889 A1 | 4/2020 | Chen et al. |
| 2020/0137085 A1 | 4/2020 | Kostyushko et al. |
| 2020/0145435 A1 | 5/2020 | Chiu et al. |
| 2020/0162252 A1 | 5/2020 | Davis et al. |
| 2020/0162494 A1 | 5/2020 | Rostami-Hesarsorkh |
| 2020/0167491 A1 | 5/2020 | Grabois et al. |
| 2020/0193019 A1 | 6/2020 | Tietz et al. |
| 2020/0195673 A1 | 6/2020 | Lee |
| 2020/0244658 A1 | 7/2020 | Meshi et al. |
| 2020/0244675 A1 | 7/2020 | Meshi et al. |
| 2020/0244676 A1 | 7/2020 | Amit et al. |
| 2020/0244683 A1 | 7/2020 | Meshi et al. |
| 2020/0244684 A1 | 7/2020 | Meshi et al. |
| 2020/0274880 A1 | 8/2020 | Badawy et al. |
| 2020/0274894 A1 | 8/2020 | Argoeti et al. |
| 2020/0285737 A1 | 9/2020 | Kraus et al. |
| 2020/0293917 A1 | 9/2020 | Wang et al. |
| 2020/0314117 A1 | 10/2020 | Nguyen et al. |
| 2020/0327221 A1 | 10/2020 | Street |
| 2020/0327225 A1 | 10/2020 | Nguyen et al. |
| 2020/0342230 A1 | 10/2020 | Tsai et al. |
| 2020/0374301 A1 | 11/2020 | Manevich et al. |
| 2020/0404007 A1 | 12/2020 | Singh et al. |
| 2021/0004458 A1 | 1/2021 | Edwards et al. |
| 2021/0064751 A1 | 3/2021 | Li et al. |
| 2021/0084063 A1 | 3/2021 | Triantafillos et al. |
| 2021/0176261 A1 | 6/2021 | Yavo et al. |
| 2021/0182387 A1 | 6/2021 | Zhu et al. |
| 2021/0209228 A1 | 7/2021 | Maor et al. |
| 2021/0224676 A1 | 7/2021 | Arzani et al. |
| 2021/0248503 A1* | 8/2021 | Hickey ............... G06F 18/2113 |
| 2021/0264028 A1 | 8/2021 | Genc et al. |
| 2021/0266339 A1 | 8/2021 | Moshitzky et al. |
| 2021/0273958 A1 | 9/2021 | McLean |

(56) References Cited

U.S. PATENT DOCUMENTS

| | | | |
|---|---|---|---|
| 2021/0286877 A1 | 9/2021 | Vijayvargiya et al. | |
| 2021/0304204 A1* | 9/2021 | Ramesh | G06F 18/217 |
| 2021/0400070 A1 | 12/2021 | Ackerman et al. | |
| 2022/0086178 A1 | 3/2022 | Jayamohan et al. | |
| 2022/0129551 A1 | 4/2022 | Collier et al. | |
| 2022/0138856 A1 | 5/2022 | Ahlstrom et al. | |
| 2022/0217156 A1 | 7/2022 | Wahbo | |
| 2022/0217166 A1 | 7/2022 | Ladnai et al. | |
| 2023/0007023 A1 | 1/2023 | Andrabi | |
| 2023/0026385 A1 | 1/2023 | Zhang et al. | |
| 2023/0075355 A1 | 3/2023 | Twigg et al. | |
| 2023/0114821 A1* | 4/2023 | Thomas | H04L 63/1433 |
| | | | 726/23 |
| 2023/0117120 A1 | 4/2023 | Johnson | |
| 2023/0117268 A1 | 4/2023 | Rimer et al. | |
| 2023/0129144 A1 | 4/2023 | Neil et al. | |
| 2023/0164039 A1 | 5/2023 | Vadlamani | |
| 2023/0164162 A1* | 5/2023 | Lee | G06N 5/045 |
| | | | 726/23 |
| 2023/0171235 A1 | 6/2023 | Chhibber et al. | |
| 2023/0199006 A1* | 6/2023 | Gurnov | H04L 63/1425 |
| | | | 726/23 |
| 2023/0224311 A1 | 7/2023 | Meshi et al. | |
| 2023/0229771 A1 | 7/2023 | Parekh et al. | |
| 2023/0247048 A1 | 8/2023 | Samosseiko et al. | |
| 2023/0269256 A1 | 8/2023 | Allon et al. | |
| 2023/0403294 A1* | 12/2023 | Bazalgette | H04L 63/1441 |
| 2024/0095350 A1* | 3/2024 | Withnell | G06F 21/554 |
| 2024/0126910 A1 | 4/2024 | Johnson et al. | |
| 2024/0211597 A1 | 6/2024 | Loman et al. | |
| 2024/0289461 A1 | 8/2024 | Ko et al. | |
| 2024/0303529 A1 | 9/2024 | Rane et al. | |
| 2024/0338489 A1 | 10/2024 | Zhu et al. | |
| 2024/0340306 A1 | 10/2024 | Staab | |
| 2024/0378423 A1* | 11/2024 | Gunnai | G06N 3/088 |
| 2024/0380766 A1 | 11/2024 | Shachar et al. | |
| 2024/0386015 A1 | 11/2024 | Crabtree et al. | |
| 2024/0414178 A1 | 12/2024 | Neuvirth-Telem et al. | |
| 2025/0007882 A1 | 1/2025 | Akhtar et al. | |
| 2025/0094585 A1 | 3/2025 | Wuest et al. | |
| 2025/0173431 A1 | 5/2025 | Divakaran et al. | |
| 2025/0181718 A1 | 6/2025 | Saqib et al. | |
| 2025/0217479 A1 | 7/2025 | Palanki | |
| 2025/0247402 A1 | 7/2025 | Singla | |
| 2025/0260712 A1 | 8/2025 | Hong et al. | |

FOREIGN PATENT DOCUMENTS

| | | | |
|---|---|---|---|
| CN | 101536455 A | 9/2009 | |
| CN | 103561048 A | 2/2014 | |
| CN | 106131050 A | 11/2016 | |
| CN | 109104395 A | 12/2018 | |
| CN | 114640507 A | 6/2022 | |
| CN | 115396324 A | 11/2022 | |
| CN | 116074031 A | 5/2023 | |
| EP | 0952521 A2 | 10/1999 | |
| EP | 2056559 A1 | 5/2009 | |
| GB | 2410402 A | 7/2005 | |
| JP | 2004046742 A | 2/2004 | |
| JP | 2009111448 A | 5/2009 | |
| JP | 2021523451 A | 9/2021 | |
| WO | 03083660 A1 | 10/2003 | |
| WO | 2015149062 A1 | 10/2015 | |
| WO | 2020100284 A1 | 5/2020 | |

OTHER PUBLICATIONS

Asrigo et al., "Using VMM-based sensors to monitor honeypots," Proceedings of the 2nd International Conference on Virtual Execution Environments, pp. 13-23, Jun. 14, 2006.
Bhuyan et al., "Surveying Port Scans and Their Detection Methodologies", Computer Journal, vol. 54, No. 10, pp. 1565-1581, Apr. 20, 2011.
Skormin, "Anomaly-Based Intrusion Detection Systems Utilizing System Call Data", Watson School of Engineering at Binghamton University, pp. 1-82, Mar. 1, 2012.
Palo Alto Networks, "Cortex XDR", datasheet, pp. 1-7, year 2020.
Palo Alto Networks, "WildFire", datasheet, pp. 1-6, year 2020.
Barford et al., "Characteristics of Network Traffic Flow Anomalies," Proceedings of the 1st ACM SIGCOMM Workshop on Internet Measurement, pp. 69-73, year 2001.
"PA-3250 Next Generation Firewall," PS-3200 Series, Datasheet, Palo Alto Networks, Inc., Santa Clara, CA, USA, pp. 1-4, year 2021.
"What is PCI DSS?" Palo Alto Networks, Cyberpedia, pp. 1-5, year 2021, as downloaded from https://www.paloaltonetworks.com/cyberpedia/what-is-a-pci-dss.
Wikipedia, "Active Directory," pp. 1-14, last edited Oct. 2021.
Light Cyber Ltd, "LightCyber Magna", pp. 1-3, year 2011.
Tier-3 Pty Ltd, "Huntsman Protector 360", Brochure, pp. 1-2, Apr. 1, 2010.
Tier-3 Pty Ltd, "Huntsman 5.7 The Power of 2", Brochure, pp. 1-2, Oct. 8, 2012.
Bilge et at., "Disclosure: Detecting Botnet Command and Control Servers Through Large-Scale NetFlow Analysis", ACSAC, pp. 1-10, Dec. 3-7, 2012.
Blum., "Combining Labeled and Unlabeled Data with Co-Training", Carnegie Mellon University, Research Showcase @ CMU, Computer Science Department, pp. 1-11, Jul. 1998.
Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.
Frosch., "Mining DNS-related Data for Suspicious Features", Ruhr Universitat Bochum, Master'sThesis, pp. 1-88, Dec. 23, 2011.
Bilge at al., "Exposure: Finding Malicious Domains Using Passive DNS Analysis ", NDSS Symposium, pp. 1-17, Feb. 6-9, 2011.
Gross et al., "FIRE: Finding Rogue Networks", Annual Conference on Computer Security Applications (ACSAC'09), pp. 1-10, Dec. 7-11, 2009.
Markowitz, N., "Bullet Proof Hosting: A Theoretical Model", Security Week, [pp. 1-5, Jun. 29, 2010, downloaded from http://www.infosecisland.com/blogview/4487-Bullet-Proof-Hosting-A-Theoretical-Model.html.
Konte et al., "ASwatch: An AS Reputation System to Expose Bulletproof Hosting ASes", SIGCOMM , pp. 625-638, Aug. 17-21, 2015.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, pp. 1-8, Dec. 8, 2010.
Goncharov, M., "Criminal Hideouts for Lease: Bulletproof Hosting Services", Forward-Looking Threat Research (FTR) Team, A TrendLabsSM Research Paper, pp. 1-28, Jul. 3, 2015.
AU Application # 2022370400 Office Action dated Jun. 12, 2024.
International Application # PCT/IB2024/052646 Search Report dated Jun. 14, 2024.
U.S. Appl. No. 17/676,275 Office Action dated Sep. 6, 2024.
Du et al., "AutoCombo: Automatic Malware Signature Generation Through Combination Rule Mining," Proceedings of CIKM '21, Virtual Event, Association for Computing Machinery, pp. 1-10, Nov. 2021.
Dropzone AI, "10X Soc Team Multiplier," AI Solutions Guide, pp. 1-4, year 2024, as downloaded from https://www.dropzone.ai/solution-sheets/dropzone-ai-solution-guide.
Dijkstra, "A Note on Two Problems in Connexion with Graphs," Numerische Mathematik 1, pp. 269-271, year 1959.
U.S. Appl. No. 17/505,673 Office Action dated Sep. 25, 2023.
U.S. Appl. No. 17/700,579 Office Action dated Oct. 13, 2023.
AU Application # 2021351215 Office Action dated Nov. 28, 2023.
Niksun, "Network Intrusion Forensic System (NIFS) for Intrusion Detection and Advanced Post Incident Forensics", Whitepaper, pp. 1-12, Feb. 15, 2010.

(56)             References Cited

OTHER PUBLICATIONS

Shulman, A., "Top Ten Database Security Threats How to Mitigate the Most Significant Database Vulnerabilities", White Paper, pp. 1-14, year 2006.
Xu, "Correlation Analysis of Intrusion Alerts," Dissertation in Computer Science submitted to the Graduate Faculty, North Carolina State University, pp. 1-206, year 2006.
Brownlee et al., "Traffic Flow Measurement: Architecture," Request for Comments 2722, Network Working Group, pp. 1-48, Oct. 1999.
U.S. Appl. No. 17/571,558 Office Action dated Jun. 26, 2023.
Palo Alto Networks, Inc., "Cortex Xsoar—Redefining Security Orchestration and Automation," product Information, pp. 1-2, year 2020.
De Leon, U.S. Appl. No. 18/322,231, filed May 23, 2023.
U.S. Appl. No. 18/361,850 Office Action dated Jun. 3, 2025.
U.S. Appl. No. 17/676,275 Office Action dated Jun. 16, 2025.
U.S. Appl. No. 18/322,231 Office Action dated Mar. 26, 2025.
Khosravi et al., "Alerts Correlation and Causal Analysis for APT Based Cyber Attack Detection," IEE Access, vol. 8, pp. 162642-162656, year 2020.
Yifan Tian, "CNN-Webshell" Malicious Web Shell Detection with Convolutional Neural Network, ACM, pp. 75-79, year 2017.
List of references, U.S. Appl. No. 18/731,420, dated Oct. 2, 2025.
List of references, U.S. Appl. No. 18/361,850, dated Dec. 30, 2025.
List of references, U.S. Appl. No. 18/661,626, dated Oct. 1, 2025.
List of references, U.S. Appl. No. 18/783,523, dated Oct. 21, 2025.
Non-Final Office Action, U.S. Appl. No. 18/731,420, dated Oct. 2, 2025.
Non-Final Office Action, U.S. Appl. No. 18/783,523, dated Oct. 21, 2025.
Non-Final Office Action, U.S. Appl. No. 18/361,850, dated Dec. 30, 2025.
Non-Final Office Action, U.S. Appl. No. 18/661,626, dated Oct. 1, 2025.
Non-Final Office Action, U.S. Appl. No. 18/499,256, dated Aug. 18, 2025.
CN Application No. 202310649492.6, First Office Action, dated Jul. 24, 2025.
Japanese Office Action, Japanese Patent Application No. 2024-505476, dated Feb. 3, 2026.

* cited by examiner

SECURITY INCIDENT RANKING AND RANKING EXPLANATION

FIELD OF THE INVENTION

The present invention relates generally to computer security, and particularly selecting and performing a protective action upon detecting a malicious incident on a data network.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including defining a set of protective actions, detecting, by a security server on a network, an incident including one or more alerts indicating malicious activity by one or more computing devices on the network, extracting, from the one or more alerts, a set of features indicating measurable characteristics of the incident, computing, based on the one or more alerts, respective counts for the features for the detected incident, computing, based on the features and their respective counts, a score indicating a magnitude of malicious activity for the detected incident, identifying a given feature having a highest impact on the score, selecting a given protective action based on the score, the identified feature and its respective count, and initiating the selected protective action with respect to at least some of the one or more computing devices.

In one embodiment, identifying a given feature having the highest impact on the score includes computing respective impact scores for each of the features, and identifying one or more of the features based on a comparison of the respective impact scores to a specified threshold, wherein selecting a given protective action includes selecting respective protective actions for the identified one or more features based on the score, the identified one or more features and their respective counts, and wherein initiating the selected protective action includes initiating the one or more respective protective actions.

In another embodiment, identifying a given feature having the highest impact on the score, includes computing respective impact scores for each of the features, ranking the features based on their respective ranking scores, and identifying one or more of the features whose respective impact scores meet a specified ranking condition, wherein selecting a given protective action includes selecting respective protective actions for the identified one or more features based on the score, the identified one or more features and their respective counts, and wherein initiating the selected protective action includes initiating the one or more respective protective actions.

In an additional embodiment, the protective actions include explanation strings, wherein selecting a given protective action includes selecting a given explanation string, and wherein initiating the protective action includes presenting, on a display, the given explanation string.

In some embodiments, initiating the given protective action includes presenting, on the display, a maliciousness indicator for the given explanation string.

In a further embodiment, the method further includes computing recency and frequency attributes for the one or more alerts, and presenting, on the display, context information for the one or more alerts based on the computed recency and frequency attributes.

In a supplemental embodiment, detecting the incident includes receiving a set of alerts including respective times and artifacts, and analyzing the times and the artifacts so as to group a subset of the alerts into the incident, wherein the subset includes the one or more alerts.

In some embodiments, receiving a given alert includes receiving the given alert from a given computing device or from a network management device managing the network.

In one embodiment, a given protective action includes isolating a given computing device.

In another embodiment, a given protective action includes restricting a user accessing a given computing device.

In an additional embodiment, a given protective action includes terminating a process executing on a given computing device.

In a further embodiment, a given protective action includes quarantining a file.

In a supplemental embodiment, one or more of the computing devices communicate with a server, and a given protective action includes isolating the server.

In one embodiment, the method further includes defining selection criteria for each of the protective actions, and selecting the given protective action includes comparing the score, the identified feature and its respective count to the selection criteria of the protective action, and detecting a match to the selection criteria for the given protective action.

In another embodiment, the features include incident features, and the method further includes extracting a set of alert features from the one or more alerts, and a given incident alert includes a count of the one or more alerts having common alert features.

In an additional embodiment, a given feature includes a given alert.

In a further embodiment, computing the score includes applying a machine learning model to the features and their respective counts.

In some embodiments, identifying the given feature having a highest impact on the score includes performing a Shapley Additive Explanation analysis on the features.

There is also provided, in accordance with an embodiment of the present invention, an apparatus, including a memory, and a processor configured to store, in the memory, a set of protective actions, to detect, on a network, an incident including one or more alerts indicating malicious activity by one or more computing devices on the network, to extract, from the one or more alerts, a set of features indicating measurable characteristics of the incident, to compute, based on the one or more alerts, respective counts for the features for the detected incident, to compute, based on the features and their respective counts, a score indicating a magnitude of malicious activity for the detected incident, to identify a given feature having a highest impact on the score, to select a given protective action based on the score, the identified feature and its respective count, and to initiate the selected protective action with respect to at least some of the one or more computing devices.

There is additionally provided, in accordance with an embodiment of the present invention, a computer software product for protecting a computing device, which includes a processor and a memory and is coupled to a storage device storing a set of one or more files, the computer software product including a non-transitory computer-readable medium, in which program instructions are stored, which instructions, when read by a computer, cause the computer to define a set of protective actions, to detect, on a network, an incident including one or more alerts indicating malicious activity by one or more computing devices on the network, to extract, from the one or more alerts, set of a features indicating measurable characteristics of the incident, to compute, based on the one or more alerts, respective counts for the features for the detected incident, to compute, based on the features and their respective counts, a score indicating a magnitude of malicious activity for the detected incident, to identify a given feature having a highest impact on the score, to select a given protective action based on the score, the identified feature and its respective count, and to initiate the selected protective action with respect to at least some of the one or more computing devices.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for a security server to protect host computers (also referred to herein as computing devices) coupled to a data network. As described hereinbelow, a set of protective actions are defined, and selection criteria for the protective actions are defined. Upon the security server detecting an incident comprising one or more alerts indicating malicious activity by one or more computing devices on the network, a set of features indicating measurable characteristics of the incident are extracted from the alerts, and based on the one or more alerts, respective counts for the features for the detected incident are computed.

Based on the features and their respective counts, a score indicating a magnitude of malicious activity for the detected incident, and a given feature having a highest (i.e., greatest) impact on the score is identified. A given protective action is selected based on a tuple comprising the score, the identified feature and its respective count. To select the given protective action, the score, the identified feature and its respective count can be compared to the selection criteria (i.e., for the protective actions), and detect that the selection criteria for the given protective action matches the computed score, the identified feature and its respective count. Finally, the selected protective action can be initiated with respect to at least some of the one or more computing devices.

In a first embodiment, a given protective action may comprise an automated system operation such as isolating one or more host computers, quarantining one or more files stored on the network or disabling a user. In a second embodiment, a protective action may comprise presenting, on a display, a text string explaining the selected feature, which can help explain the incident to a security operations center (SOC) analyst, thereby enabling the analyst to formulate a response to the incident. In the second embodiment, context information for the alerts and/or the incident may also be computed and presented to the SOC analyst, as described hereinbelow.

In some embodiments, selecting and initiating the given protective action may comprise ranking the features as to their impact on the score and initiating protective actions for the highest ranked (e.g., the top five) features. By using a ranking system to select and initiate protective actions, systems implementing embodiments of the present invention can optimize responses to security incidents comprising one or more alerts, and can also assist in explaining the incidents to SOC analysts.

System Description

Figure 1:
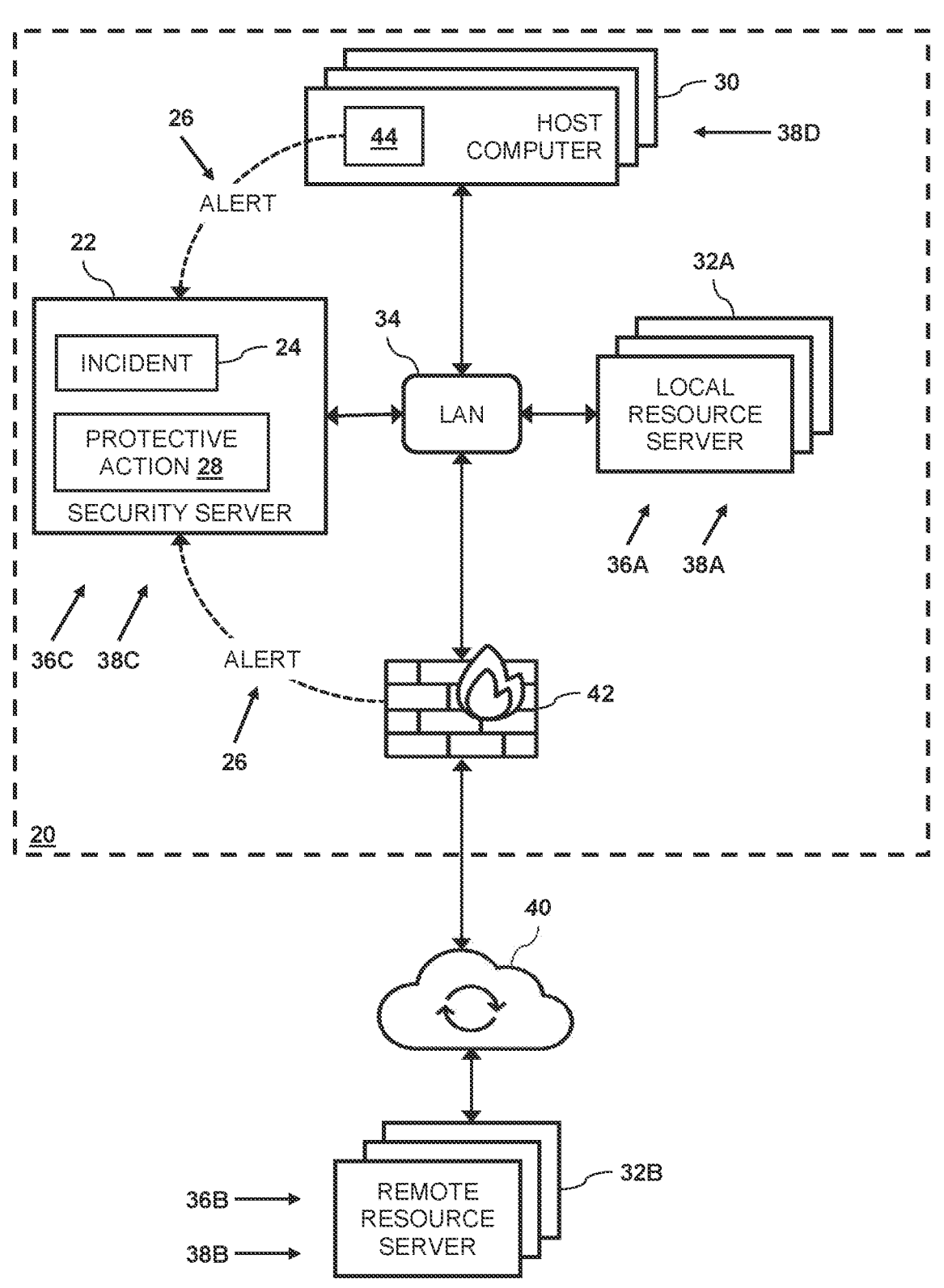
FIG. 1 is a block diagram showing an example of a computing facility comprising a security server that is configured to initiate a protective action in response to detecting to a security incident involving one or more host computers in the facility, in accordance with an embodiment of the present invention.

FIG. 1 is a block diagrams that shows an example of a computing facility 20 comprising a security server 22 that can detect an incident record 24 (also referred to herein simply as incident 24) comprising one or more alerts 26 indicating suspected malicious activity, and can initiate a protective action 28 in response to the detection, in accordance with an embodiment of the present invention.

In the configuration shown in FIG. 1, security server 22 can communicate with one or more host computers 30 and one or more resource servers 32 via a data network such as local area network (LAN) 34. In embodiments herein incidents 24 comprise one or more alerts 26 indicating suspected malicious activity initiated by one or more host computers 30 and/or one or more resource servers 32.

In some embodiments, resource servers 32 comprise (i.e., can be referenced by or accessed via) respective domains 36, and the resource servers and host computers 30 comprise respective Internet Protocol (IP) addresses 38. Resource servers can host, e.g., for computers 30, one or more web-based applications and/or provide network services such as database management systems.

LAN 34 is also coupled to a network management device such as a firewall 42 that controls and monitors traffic between LAN 34 and a public network such as Internet 40, and can generate one or more alerts 26 upon detecting malicious traffic on LAN 34 and/or received from Internet 40. One example of firewall 42 is a PA-3250 NEXT GENERATION FIREWALL™ produced by PALO ALTO NETWORKS, INC. of 3000 Tannery Way, Santa Clara, CA 95054 USA.

In embodiments described herein, resource servers 32, domains 36 and IP addresses 38 can be differentiated by appending a letter to the identifying numeral, so that the resource servers comprise local resource servers 32A and remote resource servers 32B, the domains comprise domains 36A-36C, and the IP addresses comprise IP addresses 38A-38D. In the configuration shown in FIG. 1:

Resource servers 32A are coupled to LAN 34 and comprise respective domains 36A and IP addresses 38A.

Resource servers 32B are accessible to host computers 30 via Internet 40 and comprise respective domains 36B and IP addresses 38A.

Security server 22 comprises domain 36C and IP address 38C.

Host computers 30 comprise respective IP addresses 38D.

In some embodiments, one or more host computers 30 may execute respective instances of an endpoint agent 44, and the endpoint agent executing on a given host computer can convey one or more alerts 26 in response to detecting malicious activity on the given host computer. One example of a given endpoint agent 44 is CORTEX XSOAR™ (produced by PALO ALTO NETWORKS INC.). Host computers 30 and resource servers 32 may be collectively referred to herein simply as computing devices.

Figure 2:
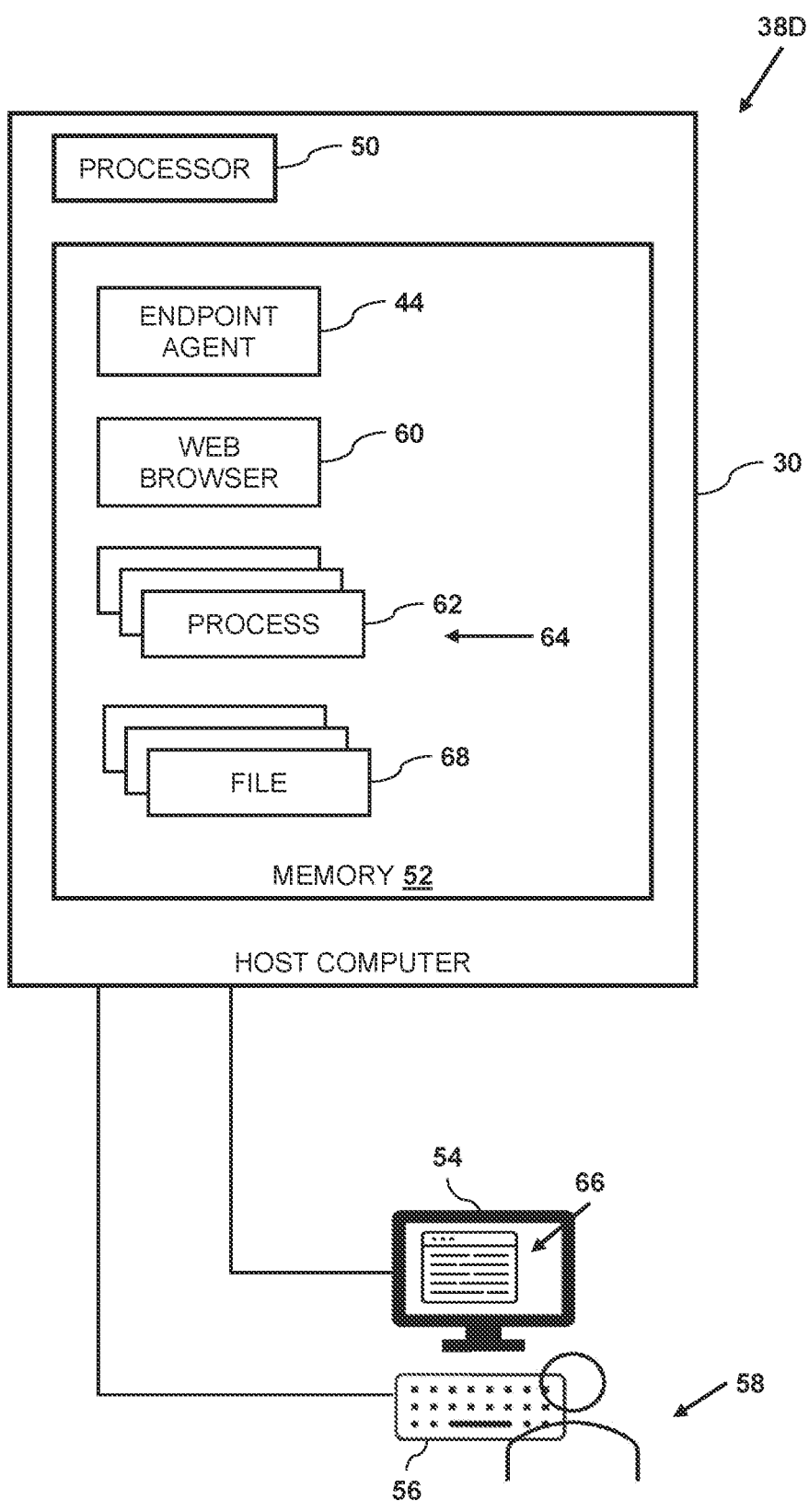
FIG. 2 is a block diagram showing an example of a configuration of a given host computer, in accordance with an embodiment of the present invention.

FIG. 2 is a block diagram showing an example of hardware and software components of a given host computer 30, in accordance with an embodiment of the present invention. The given host computer may comprise a host processor 50 and a host memory 52. In the configuration shown in FIG. 2, the given host computer may also comprise a display 54 and an input device such as a keyboard 56 that a user 58 can use in order to interact with the given host computer. In embodiments where user 58 comprises an SOC analyst, the user may be referred to herein as SOC analyst 58.

Memory 52 may comprise endpoint agent 44, a web browser 60 (i.e., a software application, a plurality of processes 62 that execute on processor 50, and a set of files 68 (e.g., data or executable files). While the configuration in FIG. 2 shows the given host computer storing file 68, storing file 68 on any computing device coupled to LAN 34 is considered to be within the spirit and scope of the present invention.

Each process 62 comprises a respective process identifier (IDs) 64. In some embodiments, a given process identifier 64 may comprise a process hash for a given process 62.

An example of web browser 60 is the CHROME™ browser produced by ALPHABET INC., 1600 Amphitheatre Parkway, Mountain View, CA 94043, USA. When executing on processor 50, browser 60 can present a rendering 66 on display 54 in response to communicating with one or more resource servers 32.

Figure 3:
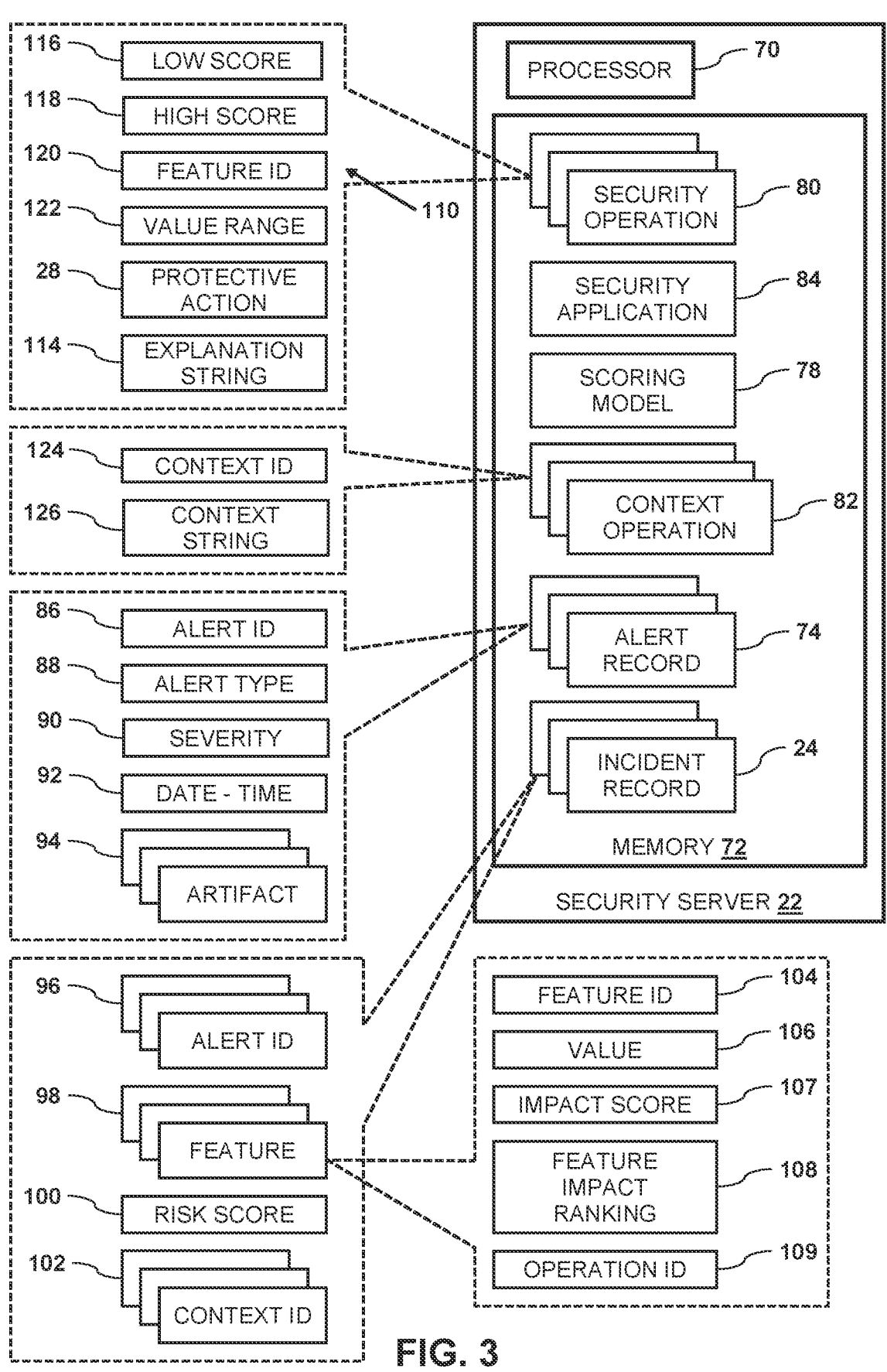
FIG. 3 is a block diagram that shows an example of a configuration of the security server, in accordance with an embodiment of the present invention.

FIG. 3 is a block diagram that shows hardware and software components of security server 22, in accordance with an embodiment of the present invention. In the configuration shown in FIG. 3, security server 22 comprises a security processor 70 and a security memory 72 that comprises a set of alert records 74, a set of incident records 24 (, a scoring model 78, a set of security operations 80, a set of context operations 82, and a security application 84. In some embodiments, security application 84 may comprise a web-based software application processor 50 and/or processor 70 can execute so as to perform embodiments described hereinbelow.

Each alert record 74 corresponds to a given alert 26 and can store information such as:

A unique alert ID 86 for the given alert.

An alert type 88 indicating a category for the given alert. Examples of alert types 88 include, but are not limited to, a suspicious process 62, a suspicious file 68, a suspicious domain 36 and a suspicious IP address 38.

An alert severity 90 indicating a risk level (e.g., low, medium, high) for the given alert.

A date and time 92 indicating when the alert was generated.

A set of artifacts 94 that comprise descriptive attributes in the given alert. Examples of artifacts 94 include, but are not limited to:

A first IP address 38 referencing a first computing device that conveyed a transmission (not shown).

A second IP address 38 referencing a second computing device that received the transmission.

A given process ID 64.

A given domain 36 for a given resource server 32 accessed by a given computing device.

A given file 68 accessed by a given computing device.

A given user 58 operating a given host computer 30.

As described in the description referencing FIG. 4 hereinbelow, security application 84 is configured to group a plurality of alerts 26 into one or more incidents 24 that can be respectively stored in incident records 24. Each incident record 24 can store information such as:

One or more alert IDs 96 referencing the one or more alerts (i.e., by respectively referencing one or more alert IDs 86.

A set of features 98 that are described hereinbelow.

A risk score 100 that indicates a suspected magnitude of malicious activity for the given incident. As described hereinbelow, scoring model 78 can compute risk score 100 based on features 98. Further details of incident scores such as risk score 100 are described in U.S. patent application Ser. No. 17/571,558, whose disclosure is incorporated herein by reference.

One or more context IDs 102. As described hereinbelow, security application 84 can populate context IDs 102 so as to present, to an SOC analyst on display 54, context information on the given incident.

Each feature 98 comprises a measurable characteristic of one or more alerts 26, and can include information such as:

A feature ID 104 (also referred to herein as feature name 104) indicating a specific characteristic. Specific characteristics are described hereinbelow.

A value 106 for the specific characteristic referenced by feature ID 104. Values 106 are described hereinbelow.

An impact score 107. In embodiments described herein, security application 84 can use scoring model 78 to compute risk score 100 for a given incident 24 based on features 98 extracted from the alerts in the given incident. In some embodiments, scoring model 78 comprises a machine learning model. Upon computing risk score 100, security application 84 can perform an analysis, such as a Shapley Additive Explanation (SHAP) analysis so as to compute respective impact scores 107 for the features used to compute the risk score, wherein the impact score for a given feature 98 indicates an impact of the given feature on the computed risk score.

A feature impact ranking 108 (also referred to herein simply as ranking 108). In some embodiments, for a given risk score 100 computed based on features 98, security application 84 can generate rankings 108 for features 98 based on their respective impact scores 107.

An operation ID 109 9 referencing a given security operation record 80. Assigning operation ID 109 to a given feature 98 is described in the description referencing FIG. 4 hereinbelow.

In a first feature embodiment, a given feature 98 may comprise an indication as to whether or not there was a specific alert in a given incident. For example, a given feature in the first feature embodiment may indicate whether or not a given endpoint agent 44 detected and prevented suspicious activity on a given host computer 30. In this example, security application 84 can store "0" to value 106 for the given feature if no endpoint agents 44 detected suspicious activity on any host computer 30, and store "1" to value 106 for the given feature if a given endpoint agent 44 detected and prevented suspicious activity on a given host computer 30.

In a second feature embodiment, a given feature 98 can be a computation based on multiple alerts. For example, in a given incident 24, a given feature in the second feature embodiment may comprise computing a count of how many different alert types 88 security application 84 detected in the alerts of the given incident.

In a third feature embodiment, a given feature 98 can be based on a historical analysis of alerts 26. For example, for a given incident 24 comprising a set of alerts 26 having respective alert types 88, a given feature may comprise whether or not a given alert type 88 or a combination of the alerts (i.e., in this and other incidents 24) is "common" (i.e., was detected X times in the past Y days).

In the configuration shown in FIG. 3, each given security operation 80 comprises selection criteria 110, a given protective action 28 and an explanation string 114. In embodiments described herein, selection criteria 110 for each given security operation 80 comprises a low score 116, a high score 118, a feature ID 120 (i.e., a feature name) and a value range 122. Value range 122 may comprise a single value (e.g., 0 or 1) or a range of values (e.g., greater than 1). Use of selection criteria 110 is described in the description referencing FIG. 4 hereinbelow.

Examples of protective actions 28, include but are not limited to:

Isolate a given host computer 30.

Terminate a given process 62 executing on a given host computer 30.

Quarantine a given file 68.

Isolate a given server 32 by restricting access to a given domain 36 or a given IP address 38.

Restrict access by a given user 58 to host computers 30. For example, a given protective action may logout, disable or suspend a login account for a given user 58, or require multi-factor authentication for the given user.

Figure 5:
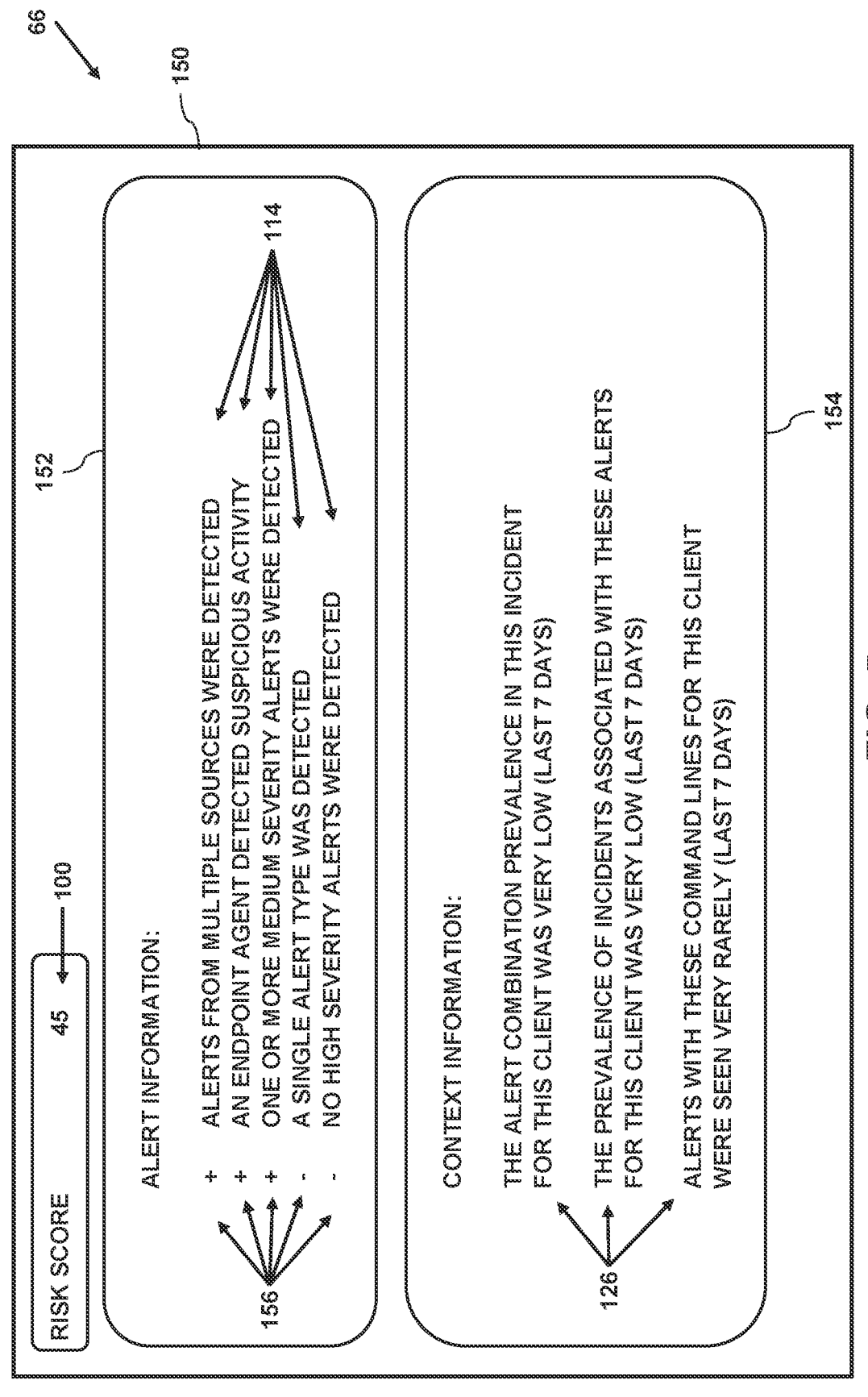
FIG. 5 is an example of a given protective action comprising an explanation window presented to a security operations center (SOC) analyst, in accordance with an embodiment of the present invention.

Explanation strings 114 provide different explanations for each combination of selection criteria 110 (i.e., different combinations of low score 116, high score 118, feature ID 120 and value range 122. Examples of explanation 114 are shown in FIG. 5 as described hereinbelow.

In the configuration shown in FIG. 3, each context operation 82 comprises a context ID 124 and a context string 126, which are described in the description referencing FIGS. 4 and 5 hereinbelow.

Processors 50 and 70 comprise general-purpose central processing units (CPU) or special-purpose embedded processors, which are programmed in software or firmware to carry out the functions described herein. This software may be downloaded to security server 22 and host computers 30 in electronic form, over a network, for example. Additionally or alternatively, the software may be stored on tangible, non-transitory computer-readable media, such as optical, magnetic, or electronic memory media. Further additionally or alternatively, at least some of the functions of processors 50 and 70 may be carried out by hard-wired or programmable digital logic circuits.

Examples of memories 52 and 72 include dynamic random-access memories, non-volatile random-access memories, hard disk drives and solid-state disk drives.

In some embodiments, tasks described herein performed by processor 70 may be split among multiple physical and/or virtual computing devices. In other embodiments, these tasks may be performed in a managed cloud service.

Feature-Based Protective Action Selection

Figure 4:
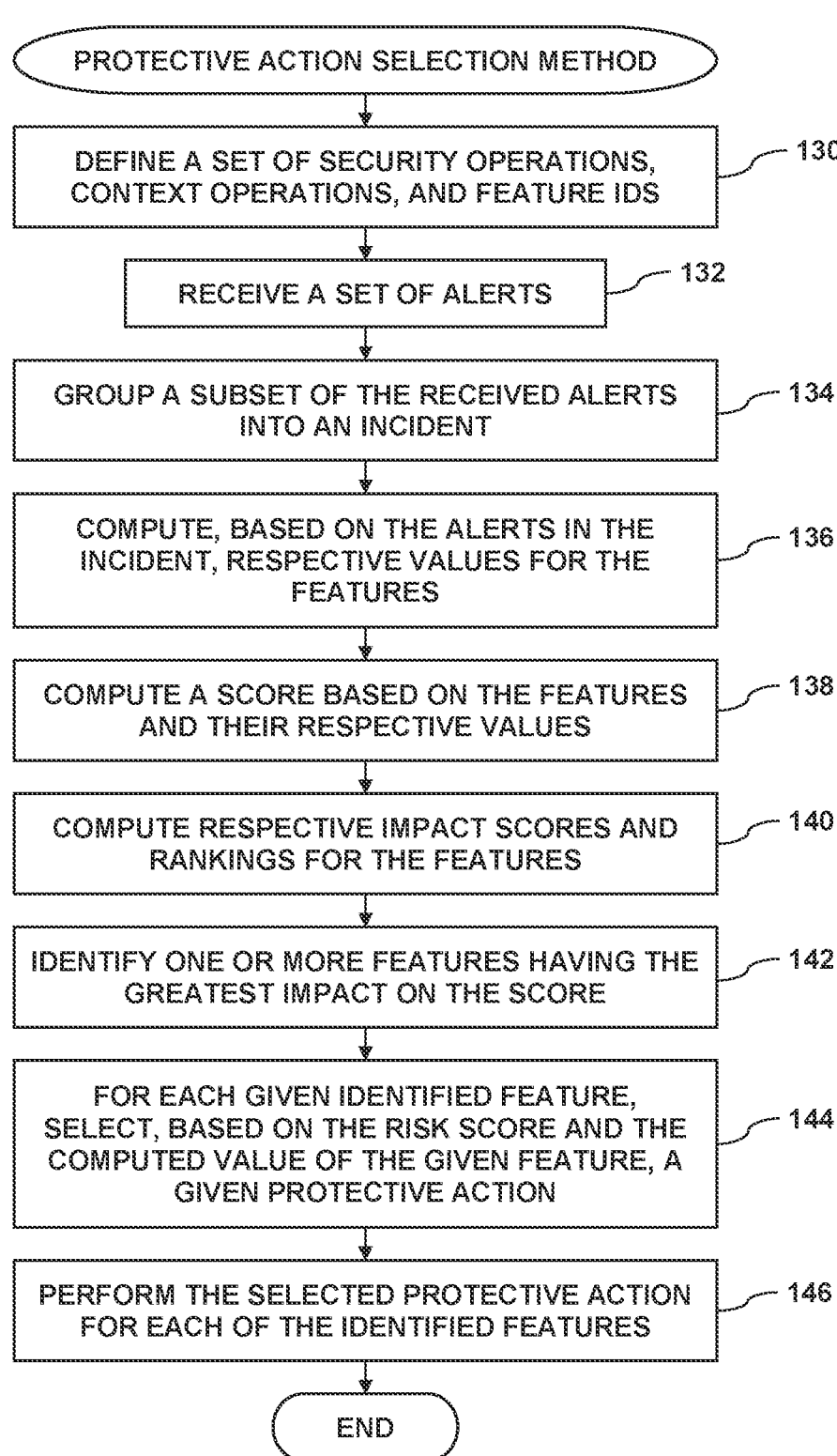
FIG. 4 is a flow diagram that schematically illustrates a method of selecting and performing a protective action in response to detecting a security incident, in accordance with an embodiment of the present invention.

FIG. 4 is a flow diagram that schematically illustrates a method of selecting and performing a given protective action 28 in response to detecting a given security incident 24, in accordance with an embodiment of the present invention.

In step 130, SOC analyst 58 accesses security application 84 via web browser 60 so as to define security operations 80, context operations 82, and feature IDs 104.

In step 132, security application 84 receives a set of alerts 26. Upon receiving each given alert 26, security application 84 can add a new alert record 74, generate and store, to the new alert record, a new alert ID 86, and populate, in the new alert record using information extracted from the received alert, alert type 88, severity 90, date and time 92 and one or more artifacts 94.

In step 134, security application 84 groups a subset of the received alerts into a new incident 24. In embodiments herein, grouping the subset of the received alerts into the new incident may also be referred to as identifying the new incident. The following are examples of how security application 84 can identify the new incident by analyzing alert records 74.

In a first example, security application 84 can identify a given alert record 74 comprising unique artifacts 94 within a specified time window. For example, by analyzing alert records 74, security application 84 can detect that only a single alert 26 within a four-hour time period was for a single access (i.e., by a single host computer 30) to a given domain 36 suspected of being malicious.

In a second example, security application 84 can identify multiple record 74 comprising identical artifacts 94 within a specified time window. For example, by analyzing alert records 74, security application 84 can detect, within a four-hour time-period, multiple alerts 26 for multiple accesses (i.e., by one or more host computers 30) to a given domain 36 suspected of being malicious.

Upon detecting the new incident, security application 84 can add a new incident record 24, and populate, in the new incident record, alert IDs 96 and feature IDs 104 with information extracted from the grouped alerts in the new incident.

In step 136, security application 84 extracts features 98 for the new incident by computing, based on the alerts in the new incident, respective values 106 for features IDs 104, and storing feature IDs 104 and their respective computed values to features 98 in the new incident record). As described supra, a given value 106 may comprise an indication as to whether or not there was a specific alert 26 in the given incident (i.e., a "1" or a "0"), or a computation based on multiple alerts 26 in the given incident.

In step 138, security application 84 computes, based on features 98 (i.e., feature IDs 104 and their respective values 106), risk score 100, and stores the computed risk score to the new incident record.

In step 140, security application 84 computes respective impact scores 107 and rankings 117 for features 98. As described supra, security application 84 can compute impact score 107 by computing respective SHAP values for features 98.

In step 142, security application 84 identifies one or more feature 98 (i.e., the feature ID 104 and the value 106 for the given feature) having the greatest impact on the computed risk score for the incident. In one embodiment, security application 84 can identify the one or more feature having the greatest impact by identifying the top N (e.g., 3, 4 or 5) features 98 based on their respective impact scores 107 (i.e., by comparing rankings 108 to a specified ranking condition). In another embodiment, security application 84 can identify the one or more feature having the greatest impact by identifying any features 98 whose respective impact scores 107 exceed a specified threshold (i.e., if higher impact scores indicate higher impact) or are below a specified threshold (i.e., if lower impact scores indicate higher impact).

In step 144, for each identified feature 98, security application 84 selects a given protective action 28 in a given security operation 80, and stores, to operation ID 109 (i.e., in the given feature), a reference to the given security operation.

To select the given protective action for a given identified feature, security application can compare risk score 100, feature ID 104 (i.e., for the given feature) and value 106 (i.e., for the given feature) to selection criteria 110 in security operations so as identify a given protective action 28 in a given security operation 80 whose selection criteria 110 matches risk score 100, feature ID 104 and value 106 (i.e., risk score 100 for the incident is greater than or equal to low score 116 in the given security operation, risk score 100 for the incident is less than or equal to high score 118 in the given security operation, feature ID 104 in the given identified feature matches feature ID 120 in the given security operation, and value 106 in the given identified feature is within value range 122 in the given security operation).

As described supra, security application 84 can select a given security operation 80 based on a combination of risk score 100 for a given incident 24 and the feature ID 104 and the value 106 for a given feature 98 extracted from the incident. In embodiments described herein, different combinations of risk scores, feature IDs 104 and 120 will result in different security operations 80 being selected by security application 84.

For example, if a given feature 98 (referenced by a given feature ID 104) indicates how many different alert types 88 are in a given incident 24, then:

In a first given security operation 80, feature ID 120 references the given feature ID 104, value range 122 is "0" (i.e., a single value), and explanation string 114 is "A single alert type was detected".

In a second given security operation 80, feature ID 120 references the given feature ID 104, value range 122 is ">0" (i.e. any value greater than 0), and explanation string 114 is "Multiple alert types were detected".

These security operations 80 may also comprise different respective protective actions 28.

Finally, in step 146, security application 84 performs the selected protective action 28 for each of the identified features 98, and the method ends. As described supra, examples of protective actions 28 include, but are not limited to, isolating a given host computer 30, terminating a given process 62 or quarantining a given file 68.

In one embodiment, performing the protective action in a given security operation 80 comprise presenting, in rendering 66 on display 54, the explanation string in the given security operation.

In another embodiment, performing a given protective action in response to identifying the incident may comprise computing recency and frequency attributes for the alerts in the incident over a specific time period (e.g., the last seven days), selecting, based on the computed recency and frequency attributes, one or more context IDs 124 referencing respective context strings 126, storing the one or more identified context IDs to respective one or more context IDs in the new incident record, and presenting, in rendering 66 on display 54, the one or more context strings 126 referenced by the one or more context IDs 124.

FIG. 5 is an example of the given protective action comprising a given rendering 66, in accordance with an embodiment of the present invention. In the example shown in FIG. 5:

Rendering 66 comprises an explanation window 150 that presents risk score 100, an alert section 152 and a context section 154.

Alert section 152 comprises the explanation strings referenced by the operation IDs in the features whose respective rankings 108 match a specified ranking condition (e.g., a specific number of highest ranked features 98). In some embodiments, for each explanation string 114 corresponding to a given feature 98, security application 84 can present, in alert section 152, a corresponding maliciousness indicator 156 indicating an impact of given feature on score 100. In the example shown in in FIG. 5, the alert icon "+" indicates that the given feature increased score 100 and the alert icon "−" indicates that the given feature decreased score 100.

Context section 154 comprises the context strings referenced by the context IDs in a given incident record 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

defining a set of protective actions;

detecting, by a security server on a network, an incident comprising one or more alerts indicating malicious activity by one or more computing devices on the network;

extracting, from the one or more alerts, a plurality of features indicating measurable characteristics of the incident, wherein the extracted features comprise at least one of: (i) whether a specific alert type is present in the incident, (ii) how many different alert types are present in the incident, and (iii) a number of times a given alert type or combination of alert types was detected in a specific previous time period;

computing, based on the one or more alerts, respective counts for the features for the detected incident;

computing, based on the features and their respective counts, a score indicating a magnitude of malicious activity for the detected incident;

identifying a given feature having a highest impact on the score;

automatically selecting a protective action from the set of protective actions based on a tuple comprising the score, the identified feature having the highest impact, and its respective count; and initiating the selected protective action with respect to at least some of the one or more computing devices.

2. The method according to claim 1, wherein identifying a given feature having the highest impact on the score comprises computing respective impact scores for each of the features, and identifying one or more of the features based on a comparison of the respective impact scores to a specified threshold, wherein selecting a given protective action comprises selecting respective protective actions for the identified one or more features based on the score, the identified one or more features and their respective counts, and wherein initiating the selected protective action comprises initiating the one or more respective protective actions.

3. The method according to claim 1, wherein identifying a given feature having the highest impact on the score, comprises computing respective impact scores for each of the features, ranking the features based on their respective ranking scores, and identifying one or more of the features whose respective impact scores meet a specified ranking condition, wherein selecting a given protective action comprises selecting respective protective actions for the identified one or more features based on the score, the identified one or more features and their respective counts, and wherein initiating the selected protective action comprises initiating the one or more respective protective actions.

4. The method according to claim 1, wherein the protective actions comprise explanation strings, wherein selecting a given protective action comprises selecting a given explanation string, and wherein initiating the protective action comprises presenting, on a display, the given explanation string.

5. The method according to claim 4, wherein initiating the given protective action comprises presenting, on the display, a maliciousness indicator for the given explanation string.

6. The method according to claim 1, and further comprising computing recency and frequency attributes for the one or more alerts, and presenting, on the display, context information for the one or more alerts based on the computed recency and frequency attributes.

7. The method according to claim 1, wherein detecting the incident comprises receiving a set of alerts comprising respective times and artifacts, and analyzing the times and the artifacts so as to group a subset of the alerts into the incident, wherein the subset comprises the one or more alerts.

8. The method according to claim 7, wherein receiving a given alert comprises receiving the given alert from a given computing device or from a network management device managing the network.

9. The method according to claim 1, wherein a given protective action comprises isolating a given computing device.

10. The method according to claim 1, wherein a given protective action comprises restricting a user accessing a given computing device.

11. The method according to claim 1, wherein a given protective action comprises terminating a process executing on a given computing device.

12. The method according to claim 1, wherein a given protective action comprises quarantining a file.

13. The method according to claim 1, wherein one or more of the computing devices communicate with a server, and wherein a given protective action comprises isolating the server.

14. The method according to claim 1, and further comprising defining selection criteria for each of the protective actions, wherein selecting the given protective action comprises comparing the score, the identified feature and its respective count to the selection criteria of the protective action, and detecting a match to the selection criteria for the given protective action.

15. The method according to claim 1, wherein the features comprise incident features, and further comprising extracting a set of alert features from the one or more alerts, wherein a given incident alert comprises a count of the one or more alerts having common alert features.

16. The method according to claim 1, wherein a given feature comprises a given alert.

17. The method according to claim 1, wherein computing the score comprises applying a machine learning model to the features and their respective counts.

18. The method according to claim 17, wherein identifying the given feature having a highest impact on the score comprises performing a Shapley Additive Explanation analysis on the features.

19. An apparatus, comprising:
a memory; and
a processor configured:
    to store, in the memory, a set of protective actions,
    to detect, on a network, an incident comprising one or more alerts indicating malicious activity by one or more computing devices on the network,
    to extract, from the one or more alerts, a plurality of features indicating measurable characteristics of the incident, wherein the extracted features comprise at least one of: (i) whether a specific alert type is present in the incident, (ii) how many different alert types are present in the incident, and (iii) a number of times a given alert type or combination of alert types was detected in a specific previous time period,
    to compute, based on the one or more alerts, respective counts for the features for the detected incident,
    to compute, based on the features and their respective counts, a score indicating a magnitude of malicious activity for the detected incident,
    to identify a given feature having a highest impact on the score,
    to automatically select a protective action from the set of protective actions based on a tuple comprising the score, the identified feature having the highest impact, and its respective count, and
    to initiate the selected protective action with respect to at least some of the one or more computing devices.

20. A computer software product for protecting a computing device, which includes a processor and a memory and is coupled to a storage device storing a set of one or more files, the computer software product comprising a non-transitory computer-readable medium, in which program instructions are stored, which instructions, when read by a computer, cause the computer:
    to define a set of protective actions;
    to detect, on a network, an incident comprising one or more alerts indicating malicious activity by one or more computing devices on the network;
    to extract, from the one or more alerts, a plurality of features indicating measurable characteristics of the incident, wherein the extracted features comprise at least one of: (i) whether a specific alert type is present in the incident, (ii) how many different alert types are present in the incident, and (iii) a number of times a given alert type or combination of alert types was detected in a specific previous time period;
    to compute, based on the one or more alerts, respective counts for the features for the detected incident;

to compute, based on the features and their respective counts, a score indicating a magnitude of malicious activity for the detected incident;

to identify a given feature having a highest impact on the score;

to automatically select a protective action from the set of protective actions based on a tuple comprising the score, the identified feature having the highest impact, and its respective count; and to initiate the selected protective action with respect to at least some of the one or more computing devices.

* * * * *